United States Patent [19]

Cooperman et al.

[11] Patent Number: 5,049,877
[45] Date of Patent: Sep. 17, 1991

[54] BROADBAND SWITCH MATRIX WITH NON-LINEAR CASCADING

[75] Inventors: Michael Cooperman, Framingham; Richard W. Sieber, Attleboro; Arnold Paige, Natick, all of Mass.

[73] Assignee: Gte Laboratories Incorporated, Waltham, Mass.

[21] Appl. No.: 626,340

[22] Filed: Dec. 13, 1990

Related U.S. Application Data

[63] Continuation of Ser. No. 324,845, Mar. 17, 1989, abandoned.

[51] Int. Cl.$^5$ .............................................. H04Q 1/00
[52] U.S. Cl. .............................. 340/825.8; 340/825.02; 340/825.85; 340/825.89; 340/825.91
[58] Field of Search ............... 307/241, 243, 244, 465, 307/576, 579, 585; 340/825.8, 825.85, 825.89, 825.91, 825.02; 370/58, 112; 379/271, 272, 273, 274, 277, 278

[56] References Cited

U.S. PATENT DOCUMENTS

| | | | |
|---|---|---|---|
| 3,619,583 | 11/1971 | Arnold | 307/465 |
| 4,453,096 | 6/1984 | Le Carr | 307/244 |
| 4,818,988 | 4/1989 | Cooperman et al. | 340/825.85 |
| 4,849,751 | 7/1989 | Barber et al. | 340/825.02 |
| 4,970,507 | 11/1990 | Cooperman et al. | 340/825.8 |

OTHER PUBLICATIONS

Barber et al., "A 64×17 Non-Blocking Crosspoint Switch," IEEE Intl. Solid-State Circuits Conf., pp. 116-117, 322, Mar. 1988.

*Primary Examiner*—Donald J. Yusko
*Assistant Examiner*—Dervis Magistre
*Attorney, Agent, or Firm*—Victor F. Lohmann, III

[57] ABSTRACT

A broadband switching matrix having M×N crosspoint switches is arranged into a selected number of groups of vertically cascaded stages in which adjacent groups are interconnected with expansion stages. An input signal switched from row to column in a particular group propagates through the remaining stages in that group and then propagates successively through the expansion stages in each following group before reaching an output port. In another array configuration, a set of N multiplexers arranged in parallel each receive N input signals and provide a single output signal at a respective output port. The multiplexers are constructed from 2:1 selector elements which are arranged in a vertical tree configuration having log$_2$N cascaded stages. Each multiplexer has the same number of stages and hence selector elements. Both broadband switching arrays are designed so that each switch drives only one other switch in the array, thereby minimizing capacitive loading and maximizing propagation speed.

15 Claims, 3 Drawing Sheets

BROADBAND SWITCH MATRIX WITH NON-LINEAR CASCADING

This is a continuation of copending application Ser. No. 07/324,845 filed on Mar. 17, 1989, now abandoned.

FIELD OF THE INVENTION

This invention relates to electronic switching systems and, more particularly, to space array architectures having the capability of switching broadband digital signals.

BACKGROUND OF THE INVENTION

There is a major effort in the communication industry to add broadband video services to the telephone network. For technical and economic reasons, the transmitted video will most likely be in digital form, requiring a data rate of over 100 Mb/s. Since this high information rate is ten thousand-fold greater than that of digitized voice, it will require techniques that emphasize high-speed performance.

Although optical switching has great switching potential, it is not yet ready for deployment. Consequently, electronic switching will be utilized in the first introduction of broadband video. The industry is focusing on CMOS space switching as the most straightforward broadband switching technique due to its high speed, high density, and low power dissipation. However, conventional broadband space switches reported have been limited to predominantly 16×16 arrays. As the size of the arrays is increased, the switching speed decreases due to a geometric increase in crosspoints and associated parasitic elements.

The source of speed limitations in conventional space switch arrays is illustrated with the equivalent circuit of FIG. 1. The array contains M inputs, each of which can be connected to N outputs by closing the switch at the intersection of an input/output line. The switches have associated stray capacitances that cause speed degradation. Therefore the speed decreases as the size of the array is increased. For example, by closing switch S11, input 1 is connected to output 1. Even though inputs 2 to M are not connected, they contribute to the stray capacitance of column 1. Similarly, even though columns 2 to N are not connected, they contribute to the stray capacitance of row 1. It can be seen that input line 1 must charge $(N-1)+(M-1)$ capacitors. The finite resistance in series with line 1 and column 1 forms an RC time constant that limits the speed of operation. As the array size is increased, this stray capacitance also increases and the speed continues to decrease.

The stray capacitance of the horizontal rows can be overcome by providing sufficient drive to the input lines. The most detrimental effect is caused by connections to the vertical lines. This is due to the fact that in reality each of the switches at the crosspoints is an active circuit that must drive the vertical line and its associated capacitive loading. It does not help to make the active switch element larger so it can drive more capacitance because the stray capacitance increases in almost direct proportion to the size of the active switch.

OBJECTS OF THE INVENTION

Accordingly, it is a primary object of this invention to obviate the above-noted and other disadvantages of the prior art.

It is a further object of this invention to construct a switching matrix wherein each crosspoint switch drives only one other crosspoint switch in the array.

It is a further object of this invention to provide a switching matrix having a minimum number of stages in each propagation path for connecting a plurality of input ports to a set of output ports.

It is a yet further object of this invention to provide a switching matrix wherein all of the input/output switching connections impose the same delay and all of the output signals have the same logical polarity regardless of the propagation path.

SUMMARY OF THE INVENTION

The above and other objects and advantages are achieved in one aspect of this invention by a novel crosspoint switching array for connecting any one of a plurality of M input ports to any one of a plurality of N output ports. The array is constructed from M×N crosspoint switching means arranged in M rows by N columns and further organized into a selected number of groups of vertically cascaded stages. The last stage in a group serves as an expansion stage for providing an interconnection to the first stage in a next group. An input signal is switched from row to column upon the activation of a selected crosspoint switching means, whereafter the signal propagates through the remaining stages in its group and then ripples down the array from one expansion stage to the next before appearing at an output port.

Each switching means has a row input/output connection, a column input/output connection, an input control means, and a selector means for selecting a digital signal present on either said row input connection or column input connection and placing the selected signal on said column output connection. The crosspoint switching means in the expansion stage has its column input connection connected to the column output connection of the crosspoint switching means from a preceding expansion stage in the column, its row input connection connected to the column output connection of the immediately preceding crosspoint switching means in the column, and its column output connection connected to the column input connection of a crosspoint switching means in the following expansion stage in the column. The connectivity among crosspoints provides that the output from each crosspoint switching means drives the input of only one other switching means in the array.

A connection means provides a common connection between the control input means of those switching means in a column having a similar location within their respective groups, except for the switching means in the expansion stages where the control input means are separate. An enabling means applies a first control signal to the control input means of the desired switching means in the array for switching the input signal from row to column, which also has the effect of enabling the respective crosspoint switches in each other group of the column due to their common connectivity. After the first switching operation, the enabling means applies a second set of control signals to the switching means in each expansion stage of the column for preventing the undesired switched signals from propagating any further once they have reached the expansion stage in their respective group, and for allowing the desired input signal, after propagating through the remaining stages in its group, to emerge from the expansion stage on a column output connection and travel to the column input connection of the next expansion stage crosspoint switch. Although blocking the undesired switched signals in their respective groups, the expansion stages beneath the selected group allow the desired signal to ripple down the column via these expansion stages and eventually emerge from the output port.

In another aspect of the present invention, a broadband switching matrix connects N input ports to a plurality of output ports. A parallel combination of multiplexing means, each having an input end connected to the input ports and an output end connected to one of said output ports, receive a plurality of input digital signals from said input ports and provide switched connections to said output ports. The multiplexing means includes a plurality of selection means arranged in a vertical tree configuration having $\log_2 N$ cascaded stages wherein the first stage is the input end and the last stage is the output end. Each selection means has a first and second input line, an input control means, and an output line for selecting a signal present on either of said input lines in response to the control means and placing the selected signal on said output line. The output signals from the selection means in one stage serve as the input signals to a next stage, except for the last stage wherein the output line is connected to said output port. The cascaded stages are interconnected so that each output line drives only one input line in the next stage.

DETAILED DESCRIPTION OF THE PREFERRED EMBODIMENT

Figure 1:
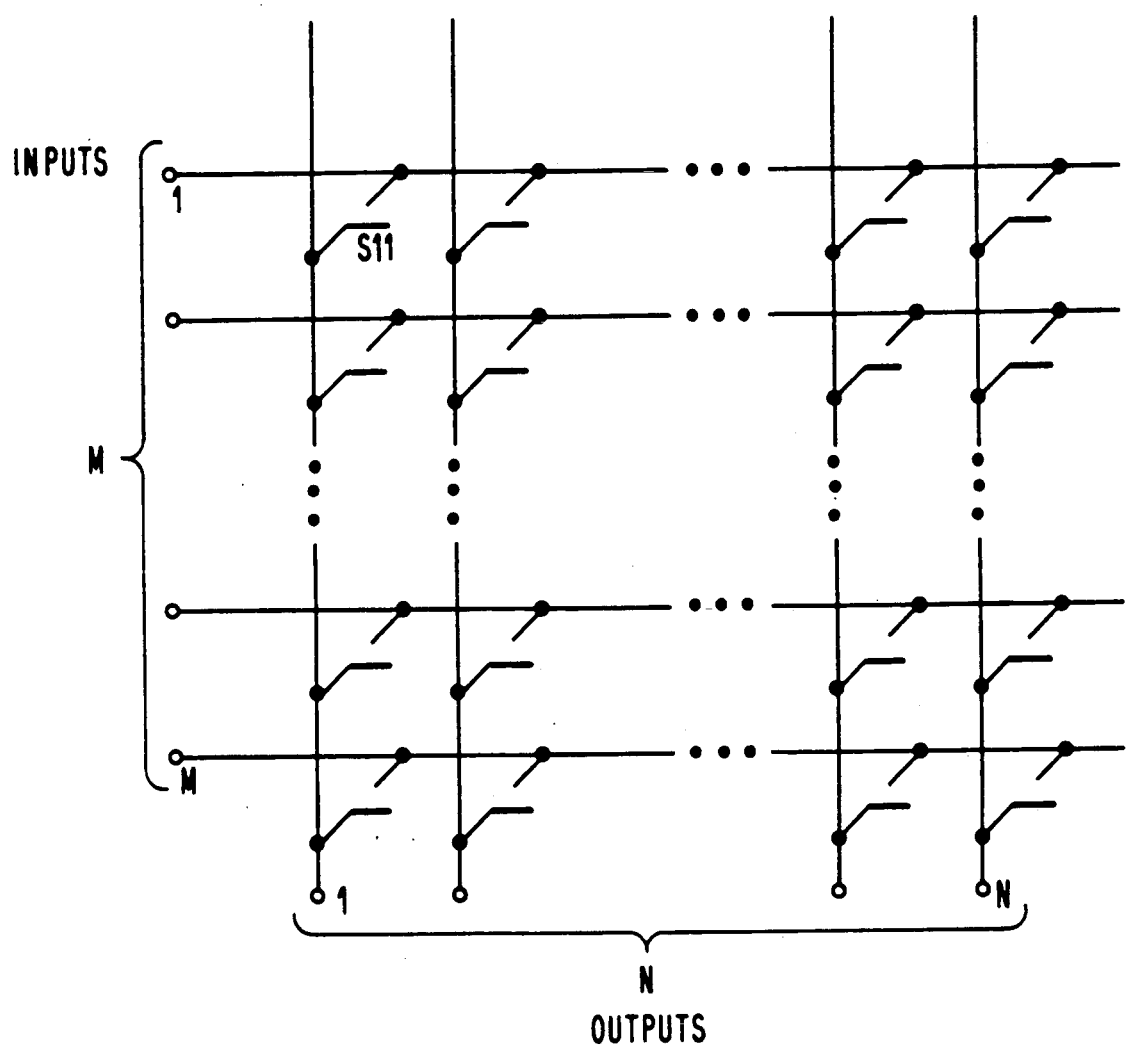
FIG. 1 is a schematic diagram of a prior art switching array and is discussed hereinabove.

The prior art switching matrix in FIG. 1 discloses an array having a linear design in which the number of stages of crosspoint switches increases in direct proportion to the number of inputs. The present invention avoids this linearity characteristic in one embodiment by arranging the individual stages into separate groups so that an input signal, once switched from row to column, does not have to ripple through each of the lower stages in the matrix before reaching an output port. A second embodiment provides a minimum number of vertically cascaded stages in each switching path. Accordingly, described herein are two embodiments of an improved array structure which reduce the number of stages traversed by an input digital signal propagating from an input port to an output port.

Figure 2:
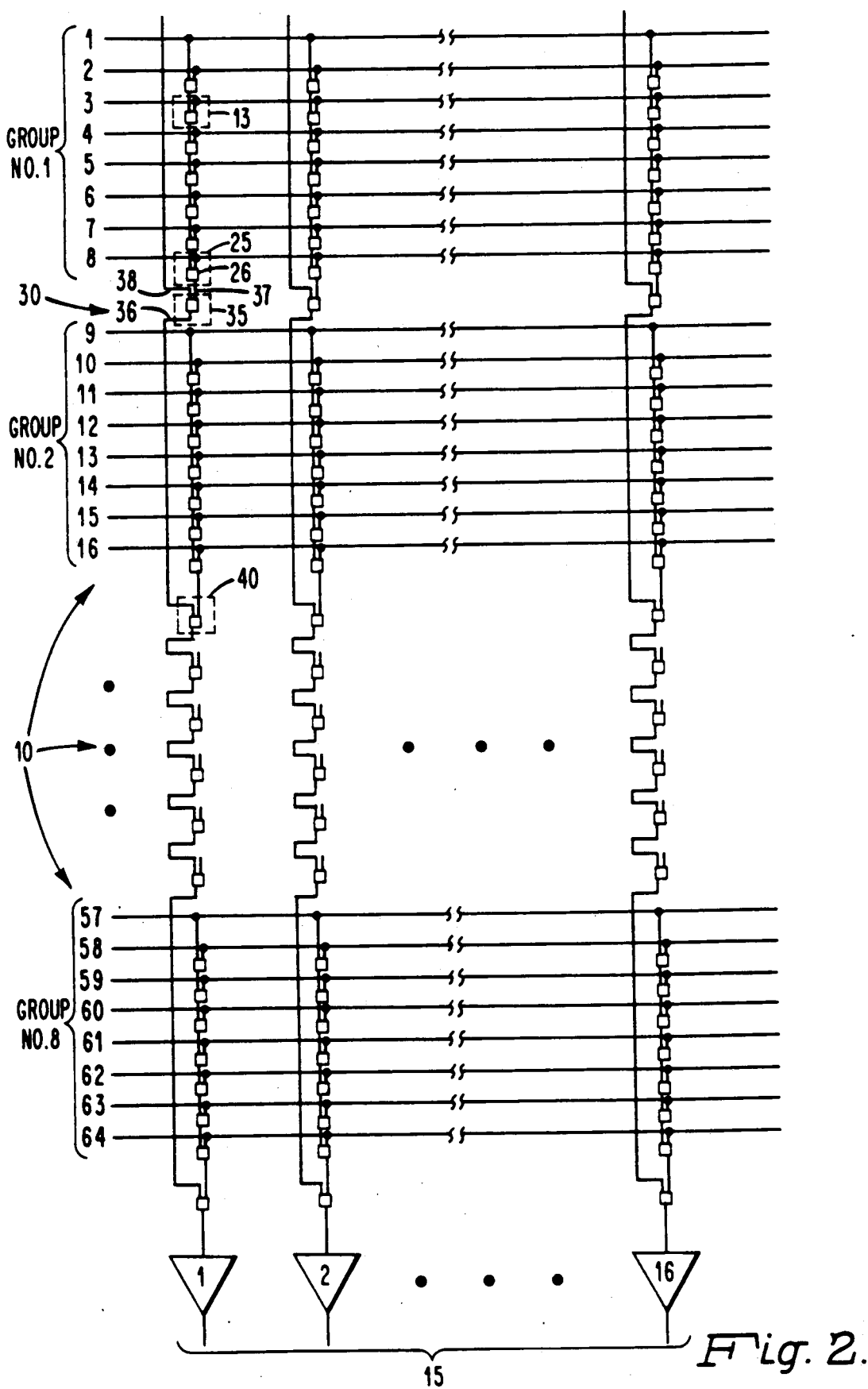
FIG. 2 is a 64×16 space switch array illustrating one aspect of the present invention.

One embodiment of the present invention illustrating the grouped-stage architecture is shown in the 64×16 array of FIG. 2. Although a 64×16 array is disclosed and hereinafter described, the matrix can easily be modified to accommodate any matrix dimension.

Referring to the operation and construction of the array in FIG. 2, a set of input digital signals are directed into sixty-four input ports numbered consecutively from 1 to 64 and located on the left edge of the array. The input signals are then placed on individual input signal lines leading into a matrix of crosspoint switches 25 which distribute the input signals among the sixteen output ports 15. The crosspoint switch 25 located at each crosspoint in the array operates in one of two modes to either switch a signal from row to column or to permit a signal traveling along a column to proceed from one stage to the next. The switch 25 consists of a column input/output connection, a row input/output connection, an input control means, and a 2:1 selector 26 which responds to the control means for selecting the signal propagating along either the column input connection or row output connection and then placing it onto the column output connection, or else allowing the signal to propagate to the row input of the next switching means in the row. The column input connection of the next switching means 35 in the column receives the selected signal, or in the case of a signal from switching means 35, switching means 40 receives the signal. Whether the signal propagates along a row or column, FIG. 2 clearly illustrates that each switching means drives only one other switching means in the array.

The 2:1 selector element 26 has been disclosed in U.S. Pat. No. 4,818,988, Ser. No. 07/140,511, which was filed Jan. 4, 1988 by inventors M. Cooperman and R. Sieber of this application and assigned to the same assignee as this application. That application is incorporated herein by reference, and specifically the drawings and descriptions of the preferred embodiments are incorporated herein by reference with respect to the structure and operation of the selector element.

The sixty-four vertical stages in the array of FIG. 2 are organized into eight groups of eight stages wherein each group is interconnected to the adjacent lower group by an expansion stage 30 constructed from individual expansion crosspoint switches 35. Although the present discussion of switches 25 and 35 concerns the stages in column 1 of group no. 1, each other column and therefore group is similarly structured. The expansion crosspoint switch 35 identical in design to the aforementioned crosspoint switch 25, is connected so that (1) the column output connection 36 connects to the column input connection of the expansion crosspoint switch 40 belonging to the expansion stage of the following group no. 2 (2) the row input connection 37 connects to the column output connection of the immediately preceding crosspoint switch 25 in the column, and (3) the column input connection 38 connects to the column output connection of the expansion crosspoint switch belonging to the expansion stage in the preceding group, which in this case does not exist since switch 35 is in the first group. This interconnection between adjacent groups allows an input signal which has been switched in one group to propagate down the column by "jumping" from one expansion stage to the next before reaching the output port, thereby eliminating the delay found in prior art matrices wherein a signal must propagate through the individual stages in each lower group in order to reach the output port. What is evident from both the crosspoint switch 25 and expansion switch 35 is that the output from either of these switches drives the input of only one other switch in the array.

The appropriate control signals are applied to the input control means of the crosspoint switches in the array for enabling the desired crosspoint switch. The control lines for those crosspoint switches in the same column which are similarly located within their respective groups are connected in common. For example, the control lines for switch 13 are connected in common to the control lines for the second crosspoint switch in each other group of the column. However, individually dedicated control lines are provided to each of the expansion crosspoint switches in the column. Each of the columns in the array has a separate set of control lines. The operation of the control means is described in greater detail in the aforementioned copending application.

The manner in which the selection process operates in choosing a switching path is illustrated in the following example. For exemplary purposes, assume that it is desired to switch an input signal from input port no. 3 to output port no. 1. The first step is to apply the appropriate control signals to the set of switches in group no. 1 of column 1 for activating crosspoint switch 13 so that the input signal propagating along row 3 will be selected and placed on the column output connection of switch 13, while at the same time preventing signals on the other input lines in the group from being switched. Due to the common connection feature, these control signals similarly enable the second crosspoint switch in each of the other eight groups in the column. Consequently, the signal switched by crosspoint 13 must be selected from among the eight available switched signals and, as such, a second set of control signals are applied to the expansion crosspoint switches in the column. These control signals allow the switched signal in group no. 1 to emerge from expansion stage switch 35 on the column output connection and thereafter proceed to the next expansion stage crosspoint switch 40 in group no. 2. In response to the control signals, the remaining expansion stages "block" the switched signals in groups 2 to 8, if any are present, from propagating beyond their respective groups, and permit any signal presented to an expansion crosspoint switch via the column input connection to propagate through that stage and proceed to the next expansion stage. Consequently, the signal from crosspoint switch 40 will ripple through crosspoint switches 41, 42, 43, 44, 45, and 46 in the expansion stages of groups 3 through 8, respectively, before reaching output port 1. A signal following the path described above travels through fourteen stages (six in group no. 1 and eight expansion stages) before reaching the output port. Depending upon the particular I/O connection, a switched signal will have to traverse at least two stages, but no more than fifteen stages. In general, a selection process defined by first selecting the desired crosspoint switch in a group and then appropriately enabling the expansion stages is executed when establishing a switching path in the array. Regardless of the path chosen, each crosspoint switch drives the input of only one other switch in the array, hence allowing a propagating signal to encounter minimum capacitance and experience maximum propagation speed.

Figure 3:
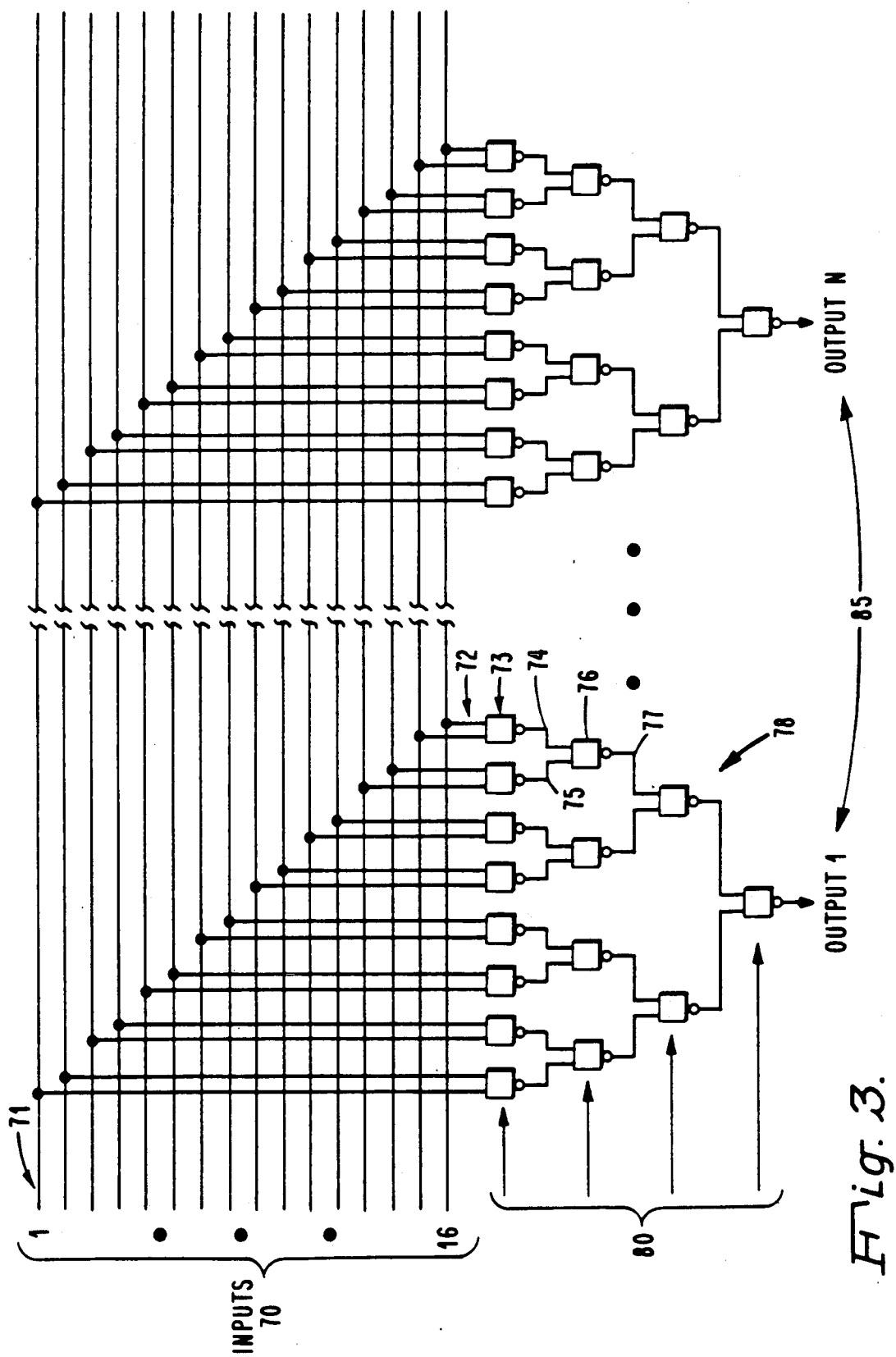
FIG. 3 is a diagram of an alternate embodiment using a minimum of vertically cascaded stages in accordance with the present invention.

In an alternate embodiment of the present invention disclosed in FIG. 3, a novel switching array exhibits a significant reduction in propagation delay by having a minimum number of cascaded stages in each I/O propagation path. In the 16×N switching matrix of FIG. 3, a set of sixteen row input ports 70 are connected to N column output ports 85 by a parallel arrangement of N tree structures 78(1) to 78(N). For explanatory purposes, the discussion below will concern the features and operation of tree structure 78(1) which is representative of the other tree structures 78(2) to 78(N). Each tree configuration 78(1) operates as a multiplexer wherein only one of the plurality of digital signals (in this case sixteen) entering an input end 72(1) of the tree structure 78(6) is selected to propagate through each vertical stage 73(1) of the tree before appearing at one of the column output ports 85, in this case output 1 for tree 78(1). The digital signals presented to the input end 72(1) are the input digital signals applied to the row input ports 70. Each cascaded stage 73(1) is constructed from 2:1 selector elements 76(1) which, as mentioned in the prior discussion of FIG. 2, have been disclosed in U.S. Pat. No. 4,818,988, Ser. No. 07/140,511, which was filed January 4, 1988 by inventors M. Cooperman and R. Sieber of this application and assigned to the same assignee as this application.

Referring again to FIG. 1, the design of the prior art matrix is such that the number of cascaded stages increases in direct proportion to the number of inputs. In the present invention of FIG. 3, the number of cascaded stages increases logarithmically with the number of inputs, hence reducing the number of stages. Generally speaking, N inputs require $\log_2 N$ stages whereby the number of inputs can be increased by a factor of two each time a stage is added. Accordingly, the embodiment of FIG. 3 requires 4 cascaded stages to accommodate the 16 inputs. Of course, the array can be expanded to have any number of outputs since a single tree structure need only be included for each additional output port.

Referring specifically to the tree structure 78(1) in FIG. 3, four vertically cascaded stages 73(1) are used to implement the 16-to-1 multiplexing operation wherein each stage, except the first stage, has half the number of selectors 76(1) as a preceding stage. This permits all of the output lines from one stage to be connected in pairs to the selector input lines of the next stage. As with the array of FIG. 2, the output line from each selector drives the input of only one selector element in the next stage. This design advantage again results in minimizing capacitive loading and maximizing throughput speed. The input lines to the selectors in the first stage are connected in pairs to the input signal lines 71 which are in turn connected to the input ports 70.

The control process for selecting the proper connectivity between the input and output ports is easily implemented. For each tree structure, a set of control lines are connected to the respective plurality of selectors 76(1) such that each control line is dedicated to a particular stage and is connected in common to the control input line of each selector element in that particular stage. Accordingly, four control lines 80(11) to 80(14) are connected to the four cascaded stages 73(1) of tree 78(1). A control signal applied to one of the control lines 80 selects either the group of right-sided selector inputs or the group of left-sided selector inputs entering a particular stage whereupon the selected inputs serve as the input signals to a following stage. In particular, the left and right input line selector 76(1) are designated by reference numerals 75(1) and 74(1), respectively, and the output line is designated by numeral 77(1). As indicated at the output of selector element 76(1), an inversion operation is performed on the selected digital signal. Further selection in each remaining stage is accomplished by applying the appropriate control signals. For example, the selection of input 3 would require enabling the left-sided selector inputs of stage 1 (uppermost stage), enabling the right-sided selector inputs of stage 2, and then enabling the left-sided selector inputs of the remaining two stages.

What has been shown and described in FIG. 3 is a novel space array architecture providing the following advantages over the prior art: (1) a minimum number of stages are required, (2) the control need not be decoded, (3) all inputs are switched with the same delay, and (4) all outputs have the same logical polarity. The principal advantage derived from isolating each crosspoint from the remaining crosspoints in the array permits an increase in the array size without any deterioration of the switching speed. The alternative embodiment in FIG. 2 offers a reduction in the number of stages traversed by a switched signal due to the organization of the stages into groups and their interconnection with expansion stages. This matrix is likewise designed so that each crosspoint switch drives only one other crosspoint switch in the array.

What is claimed is:

1. A broadband switching matrix for switching high data rate signals between any one of a plurality of N input ports to any one of a plurality of output ports, each of said input ports being connected to an input signal line, comprising:
- a parallel combination of multiplexing means each having an input end connected to the input signal lines and an output end connected to a respective one of said output ports;
- each of said multiplexing means including a plurality of selection means arranged in $\log_2 N$ cascaded stages to form a vertical tree configuration wherein the first of said stages is said input end and the last of said stages is said output end;
- each of said selection means having a first input line, a second input line, an input control means, and an output line wherein the output line drives a single input line of a selection means in the next stage, said selection means further including a buffer means having an input coupled to said input lines and having an output coupled to the output line wherein said buffer means electrically isolates said input lines from said output line;
- wherein the input control means of each selection means in a respective stage of a particular multiplexing means are connected in common;
- said selection means being operable in response to a first control condition at the respective control input means to provide a closed circuit condition between the first input line and the output line thereof and an open circuit condition between the second input line and the output line thereof; and
- said selection means being operable in response to a second control condition at the respective control input means to provide an open circuit condition between the first input line and the output line thereof and a closed circuit condition between the second input line and the output line thereof.

2. A crosspoint switching array for connecting any one of a plurality of M row input ports to any one of a plurality of N column output ports, comprising:
- $M \times N$ crosspoint switching means arranged in M rows by N columns and further organized into a selected number of groups of vertically cascaded stages wherein the last stage in a group serves as an expansion stage for providing an interconnection to the expansion stage in a next group;
- each crosspoint switching means comprising
  - a row input connection and a row output connection, the row input connection being connected to the row output connection of the preceding crosspoint switching means in the row, and the row output connection being connected to the row input connection of the following crosspoint switching means in the row;
  - a column input connection and a column output connection, the column input connection being connected to the column output connection of the preceding crosspoint switching means in the column, and the column output connection being connected to the column input connection of the following crosspoint switching means in the column;
  - selector means having a first input connected to the column input connection, a second input connected to the row output connection, an output connected to the column output connection, and control input means;
  - said selector means being operable in response to a first control condition at the control input means to provide a closed circuit condition between the first input and the output thereof and an open circuit condition between the second input and the output thereof; and
  - said selector means being operable in response to a second control condition at the control input means to provide an open circuit condition between the first input and the output thereof and a closed circuit condition between the second input and the output thereof;
- each of the crosspoint switching means in said respective expansion stage having the column input connection connected to the column output connection of that crosspoint switching means in the column belonging to the expansion stage of the preceding group, the row input connection connected to the column output connection of the immediately preceding crosspoint switching means in the column, and the column output connection connected to the column input connection of the crosspoint switching means in the column which belongs to the expansion stage of the following group;
- means for providing a common connection between the control input means of those crosspoint switching means in a column having a similar location within their respective groups, except for the crosspoint switching means in said expansion stages wherein the control input means are separate: and
- means for establishing a connection between an input port and an output port, said connection passing through a selected crosspoint switching means in the array, by applying the appropriate control conditions to the control input means of each crosspoint switching means in the same column as said selected switching means so that when an input signal is switched from row to column at said selected crosspoint, said signal propagates through the remaining stages of said respective group and then propagates successively through the expansion stage in each following group before reaching said output port.

3. The broadband switching matrix as recited in claim 1 wherein said buffer means includes:
an inverter circuit.

4. The broadband switching matrix as recited in claim 1 wherein:
said selection means being operable in response to a first control condition at the input control means to provide a closed circuit condition between the first input and the output thereof and an open circuit condition between the second input and the output thereof; and said selection means being operable in response to a second control condition at the input control means to provide an open circuit condition between the first input and the output thereof and a closed circuit condition between the second input and the output thereof.

5. The broadband switching matrix as recited in claim 4 wherein said selection means includes:

first switching means having an input connected to the first input of the selection means and having an output connected to the input of said buffer means;

second switching means having an input connected to the second input of the selection means and having an output connected to the input of said buffer means;

said first switching means being coupled to said control input means, said first switching means being biased in a closed condition when the first control condition is present at said control input means, and being biased in an open condition when the second control condition is present at said control input means; and said second switching means being coupled to said control input means, said second switching means being biased in an open condition when the first control condition is present at said control input means, and being biased in a closed condition when the second control condition is present at said control input means.

6. The broadband switching matrix as recited in claim 5 wherein:

said buffer means includes driver circuit means for producing a first predetermined voltage level at the output thereof in response to a digital signal of one binary value at the input thereto and for producing a second predetermined voltage level at the output thereof in response to a digital signal of the opposite binary value at the input thereto.

7. The broadband switching matrix as recited in claim 6 wherein:

said driver circuit means of said buffer means includes a column inverter circuit of a first column buffer transistor connected between a source of operating potential and the output of a selection means, and a second column buffer transistor, complementary to said first column buffer transistor, connected between the output of said selection means and a point of reference potential, said first and second column buffer transistors each having a control electrode connected to the outputs of said first and second switching means.

8. The broadband switching matrix as recited in claim 7 wherein:

said first switching means includes a first column switching transistor connected between said first input and the control electrodes of the first and second column buffer transistors and a second column switching transistor, complementary to said first column switching transistor, connected between said first input and the control electrodes of the first and second column transistors in parallel with said first column switching transistor;

said second switching means includes a third column switching transistor connected between said second input and the control electrodes of the first and second column buffer transistors and a fourth column switching transistor, complementary to said third column switching transistor, connected between said second input and the control electrodes of the first and second column buffer transistors in parallel with said third column switching transistor;

said first column switching transistor and said fourth column switching transistor being complementary transistors and each having a control electrode connected in common to a first control input connection;

said second column switching transistor and said third column switching transistor having complementary transistors and each having a control electrode connected in common to a second control input connection;

said first and second column switching transistors being biased for conduction therethrough and said third and fourth column switching transistors being biased to nonconduction when a first voltage level is present at said first control input connection and a second voltage level is present at said second control input connection; and said third and fourth column switching transistors being biased for conduction therethrough and said first and second column switching transistors being biased to nonconduction when said second voltage level is present at said first control input connection and said first voltage level is present at said second control input connection.

9. A broadband switching matrix for switching high data rate signals between any one of a plurality of N input ports to any one of a plurality of output ports, each of said input ports being connected to an input signal line, comprising:

a parallel combination of multiplexing means each having an input end connected to the input signal lines and an output end connected to a respective one of said output ports;

each of said multiplexing means including a plurality of selection means arranged in $\log_2 N$ cascaded stages to form a tree architecture wherein for each multiplexing means the first stage serves as the input end and the last stage serves as the output end;

each of said selection means having an input control means, a plurality of unswitched inputs, and an output wherein said output drives only one unswitched input of a selection means in a next stage, said selection means further including an isolation means having an input coupled to said unswitched inputs and having an output coupled to the output of said selection means wherein said isolation means is effective in electrically isolating said unswitched inputs from said output;

wherein the input control means of each selection means in a respective stage of a particular multiplexing means are connected in common; and each of said selection means being responsive to said input control means for operably selecting a signal present at a selected one of said unswitched inputs and coupling said selected signal to said output.

10. The broadband switching matrix as recited in claim 9 wherein:

each of said selection means has a first and second input.

11. The broadband switching matrix as recited in claim 10 wherein:

said selection means being operable in response to a first control condition at the input control means to provide a closed circuit condition between the first input and the output thereof and an open circuit condition between the second input and the output thereof; and said selection means being operable in response to a second control condition at the input control means to provide an open circuit condition between the first input and the output thereof and a closed circuit condition between the second input and the output thereof.

12. The broadband switching matrix as recited in claim 11 wherein said selection means includes:

first switching means having an input connected to the first input of the selection means and having an output connected to the input of said isolation means;

second switching means having an input connected to the second input of the selection means and having an output connected to the input of said isolation means;

said first switching means being coupled to said control input means, said first switching means being biased in a closed condition when the first control condition is present at said control input means, and being biased in an open condition when the second control condition is present at said control input means; and said second switching means being coupled to said control input means, said second switching means being biased in an open condition when the first control condition is present at said control input means, and being biased in a closed condition when the second control condition is present at said control input means.

13. The broadband switching matrix as recited in claim 12 wherein:

said isolation means includes driver circuit means for producing a first predetermined voltage level at the output thereof in response to a digital signal of one binary value at the input thereto and for producing a second predetermined voltage level at the output thereof in response to a digital signal of the opposite binary value at the input thereto.

14. The broadband switching matrix as recited in claim 13 wherein:

said driver circuit means of said isolation means includes a column inverter circuit of a first column buffer transistor connected between a source of operating potential and the output of a selection means, and a second column buffer transistor, complementary to said first column buffer transistor, connected between the output of said selection means and a point of reference potential, said first and second column buffer transistors each having a control electrode connected to the outputs of said first and second switching means.

15. The broadband switching matrix as recited in claim 14 wherein:

said first switching means includes a first column switching transistor connected between said first input and the control electrodes of the first and second column buffer transistors and a second column switching transistor, complementary to said first column switching transistor, connected between said first input and the control electrodes of the first and second column transistors in parallel with said first column switching transistor;

said second switching means includes a third column switching transistor connected between said second input and the control electrodes of the first and second column buffer transistors and a fourth column switching transistor, complementary to said third column switching transistor, connected between said second input and the control electrodes of the first and second column buffer transistors in parallel with said third column switching transistor;

said first column switching transistor and said fourth column switching transistor being complementary transistors and each having a control electrode connected in common to a first control input connection;

said second column switching transistor and said third column switching transistor having complementary transistors and each having a control electrode connected in common to a second control input connection;

said first and second column switching transistors being biased for conduction therethrough and said third and fourth column switching transistors being biased to nonconduction when a first voltage level is present at said first control input connection and a second voltage level is present at said second control input connection; and said third and fourth column switching transistors being biased for conduction therethrough and said first and second column switching transistors being biased to nonconduction when said second voltage level is present at said first control input connection and said first voltage level is present at said second control input connection.

* * * * *